United States Patent [19]

Shufflebarger et al.

[11] 4,018,686
[45] Apr. 19, 1977

[54] FLUID STRAINER ELEMENT

[75] Inventors: Earl D. Shufflebarger, Mentor; Edward E. Kish, Kirtland; Frank M. Cunningham, Solon; John R. Boylan, Euclid: Donald J. Murauskas, Painesville, all of Ohio

[73] Assignee: Nupro Company, Willoughby, Ohio

[22] Filed: July 10, 1975

[21] Appl. No.: 594,612

[52] U.S. Cl. .............................. 210/448; 55/500; 55/DIG. 31; 210/452; 210/497 R

[51] Int. Cl.² ........................................ B01D 29/14

[58] Field of Search .......... 210/435, 446, 447, 448, 210/450, 451, 453, 484, 497–499, DIG. 10; 55/492, 495, 500, DIG. 31

[56] References Cited

UNITED STATES PATENTS

| | | | |
|---|---|---|---|
| 1,115,016 | 10/1914 | Pheils | 210/497 X |
| 1,961,498 | 6/1934 | Krueger | 210/447 X |
| 2,979,209 | 4/1961 | Nolden | 210/435 |
| 3,011,644 | 12/1961 | Farrell et al. | 210/453 X |
| 3,204,391 | 9/1965 | Schwab | 210/447 X |
| 3,307,337 | 3/1967 | Freitas, Jr. et al. | 55/500 |
| 3,320,727 | 5/1967 | Farley et al. | 55/495 X |
| 3,456,799 | 7/1969 | Musial | 210/448 X |
| 3,931,015 | 1/1976 | Jenkins | 210/451 X |

*Primary Examiner*—Frank W. Lutter
*Assistant Examiner*—William A. Cuchlinski, Jr.
*Attorney, Agent, or Firm*—Fay & Sharpe

[57] ABSTRACT

A fluid strainer element capable of withstanding high differential pressures when used and which facilitates straining of fluid flowing through the continuous side wall and one end wall of the element. The strainer is generally cup-shaped and includes an inner cup-shaped support structure having staggered perforations extending through the surfaces thereof. An outer cup-shaped strainer structure constructed of wire mesh is closely received over the support structure with the open ends of the two structures being substantially coextensive with each other. An annular binding ring is closely received over the structure open ends and is rigidly affixed thereto. The mesh size of the straining structure may be varied as is desired and/or necessary for any use and normal fluid flow through the strainer is from outside to inside the element.

14 Claims, 3 Drawing Figures

FLUID STRAINER ELEMENT

BACKGROUND OF THE INVENTION

This invention pertains to the art of strainers and more particularly to fluid strainers.

The invention is particularly applicable to a liquid strainer adapted to be mounted within a strainer housing and will be described with particular reference thereto; however, it will be appreciated by those skilled in the art the the invention has broader applications and may be readily employed in other environments.

Fluid strainer elements are known in the art and have been designed and developed for a number of specific uses. However, none of these prior strainer designs are deemed applicable to or have the necessary physical strength for applications where differential pressures acting on the strainer element may be in the range of 1000 psi. Typically, prior strainers have merely been comprised of a cylindrical core member which provides some strength and rigidity for a straining media which closely surrounds the core.

While many of the prior known strainers merely comprised elongated open ended cylindrical arrangements, some prior strainers did include end walls or caps for closing either one or both ends of the cylinder. Ordinarily, however, these end walls were solid so as to block any fluid flow therethrough resulting in undesirable elevated differential pressures acting on the strainer during use. In addition, liquid passing toward contact with such prior strainers would necessarily hit the closed ends and rebound therefrom so as to cause turbulence in the remainder of the liquid flow. These operational characteristics are extremely undesirable in most applications since they can affect overall operation of an entire liquid system.

Many of the prior strainer designs did not give due consideration to the various types of fluids which the strainers could and/or would be employed. Practical application of the prior strainer designs was, therefore, limited or restricted. Quite often they could not be employed in corrosive or abrasive environments where the temperature of the fluid would be substantially elevated or reduced. This limitation could often be attributed to the fact that many prior strainers were not permanent and were more of a "throw away" type for cost reduction purposes.

It is also known to use sintered metal elements having generally cup-shaped configurations and being manufactured from ceramic or metal materials by powdered metallurgy techniques. Elements formed by such means are classified as filters and may be differentiated from strainers to which the subject invention is directed by a number of functional and structural distinctions. Typically, however, the sintered filters could not be satisfactorily manufactured with particles beyond a certain micron size since, once the sintered particles got much above 90 to 120 microns, the overall structural strength of the filter was substantially reduced so that chipping or breakage during handling and use became a problem. Since the prior sintered elements acted as filters in which virtually all particles in a liquid flowing therethrough were removed, the resistance or restriction to flow through them was quite high. As a result, very high differential pressures were frequently created which, when acting against this type of filter, caused undesired collapsing and complete failure, or caused pressure drop in the system to an undesirable degree.

The present invention contemplates a new and improved article which overcomes all of the above referred to problems and others and provides a new strainer element which is relatively simple in design, can readily withstand high differential pressures, may be employed in any number of different fluid environments including corrosive and abrasive environments and which may be readily backwashed and reused.

BRIEF DESCRIPTION OF THE PRESENT INVENTION

In accordance with the present invention, there is provided a generally cup-shaped fluid strainer element which allows the straining of fluid through the side walls and a closed end wall thereof. The strainer is comprised of a generally cup-shaped supporting structure having a continuous side wall, a closed end and an open end with the side wall end and closed end having a pattern of spaced openings over the surfaces thereof. A generally cup-shaped straining structure having a continuous side wall, a closed end wall and an open end with the straining structure side wall and closed end wall being constructed from a wire mesh or cloth is closely received over the supporting structure. The open ends of the supporting and straining structure are substantially coextensive with each other and a binding ring generally U-shaped in cross-section is closely received over and rigidly affixed to the open ends.

In accordance with another aspect of the present invention, the supporting and straining structures are each comprised of a generally cylindrical side wall portion and a separate end wall portion rigidly affixed to the side wall portions.

In accordance with still another aspect of the present invention, the spaced openings in the supporting structure comprise a plurality of perforations disposed on staggered centers relative to adjacent perforations.

In accordance with yet another aspect of the present invention, the entire strainer element is constructed from stainless steel and the components are assembled together by means of resistance lap welding and silver brazing.

The principal object of the present invention is the provision of a new and improved strainer element.

Another object of the present invention is the provision of a new and improved strainer element which may be used in high differential pressure situations.

Still another object of the present invention is the provision of a new and improved strainer element which may be used through a wide range of temperatures.

Yet another object of the present invention is the provision of a new and improved strainer element which facilitates increased fluid flow capacity therethrough.

Yet another object of the present invention is the provision of a new and improved strainer element which is readily adapted to use in a plurality of fluid environments, including corrosive and abrasive environments.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof and wherein.

DESCRIPTION OF THE PREFERRED EMBODIMENT

Figure 1:
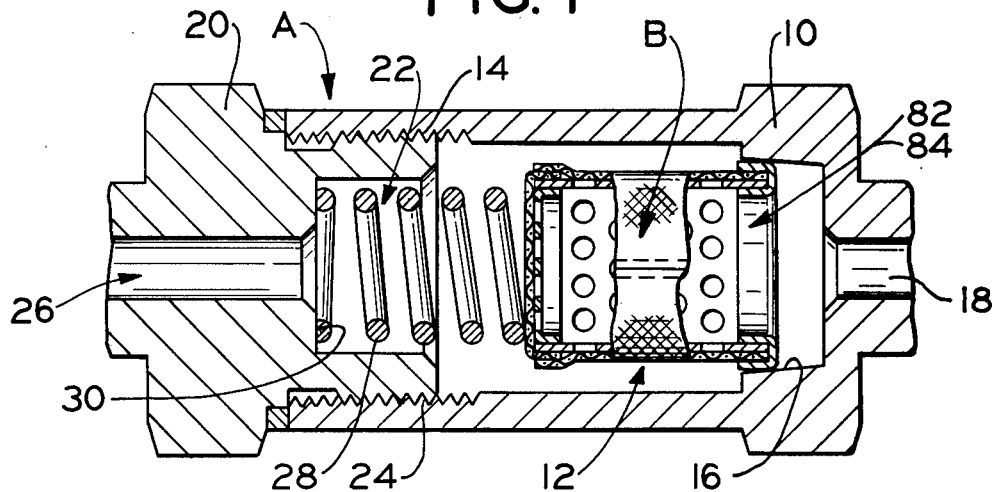
FIG. 1 is a cross-sectional view of a typical liquid strainer body showing the subject strainer element mounted therein.
Figure 2:
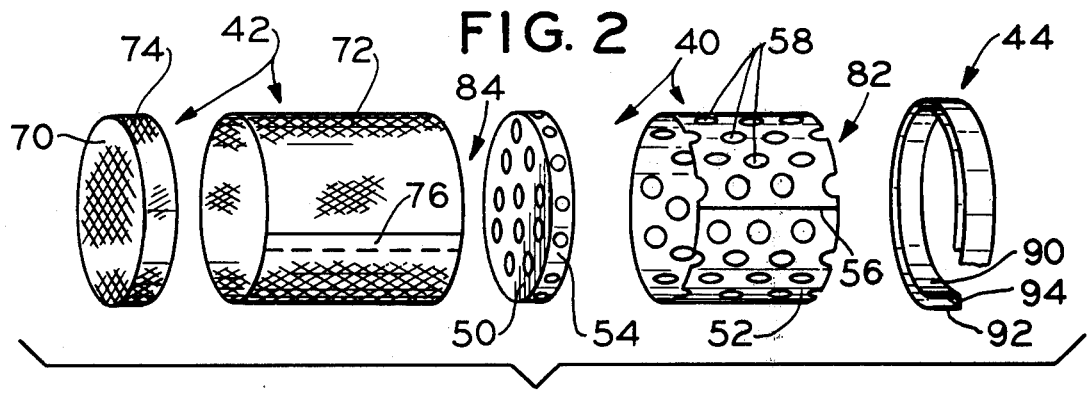
FIG. 2 is an exploded perspective view of the subject strainer element.

Referring now to the drawings wherein the showings are for purposes of illustrating the preferred embodiment of the invention only and not for purposes of limiting same, the Figures show a typical in-line removable strainer arrangement A having a strainer element B disposed therein.

More particularly, the in-line fluid strainer A has an outer body member 10 which includes an axial passageway 12 therein having a threaded area 14 disposed at one end. Passageway 12 includes a reduced diameter strainer receiving area 16 which, in turn, leads into an extension or fluid outlet 18.

Cooperating with outer body member 10 is an inner body member 20 having a axial passageway 22 disposed therein. The inner body member includes a threaded lead or outer end 24 and threaded area 14 and a threaded lead or outer end 24 cooperate with each other in order that the inner and outer body members 10,20 may be threadedly assembled to each other. A passage or inlet 26 communicates with passageway 22 and a coil spring biasing means 28 acts between a shoulder 30 and the end cap of strainer element B. The biasing means continuously urges strainer element B into a tapered strainer receiving area 16 for sealing purposes.

Additional elaboration on the typical environment in which the subject strainer element may be employed is not deemed necessary here inasmuch as the environment or structural arrangement does not form a part of the present invention. However, additional information and disclosure concerning the general arrangement disclosed hereinabove may be obtained from the commonly assigned and issued U.S. Pat. Nos. 3,240,342 and 3,240,346.

The strainer element B of the subject invention is comprised of a generally cup-shaped supporting structure 40, a generally cup-shaped straining structure 42 and a binding ring generally designated 44. While these components could be constructed from any number of materials, in the preferred arrangement they are constructed from stainless steel. Use of stainless steel is deemed to provide additional rigidity for the overall structure and to facilitate its use in high and low temperature applications as well as with corrosive and/or abrasive fluids.

Supporting structure 40 is comprised of two components, namely, an end cap portion 50 and a side wall portion 52. The end cap portion has a generally circular configuration and includes a flange 54 depending from the outermost edge thereof. Use of this flange will be described in detail hereinafter. Side wall portion 52 is cylindrical and is fabricated to that configuration from a piece of flat stock having opposed side edges which then are joined together to form a seam 56 extending generally longitudinally along the entire side wall portion. Flange 54 on end cap portion 50 is received within one end of side wall portion 52 and then rigidly affixed thereto in order to provide for a permanent construction. The end cap and side wall portions 50,52 include a plurality of perforations 52 therein. These perforations are desirably located on staggered centers and, while other perforation sizes and locations may be employed, perforations having a diameter of 0.085inches on staggered centers of 0.125inches are preferred. That is, and with particular reference to FIG. 3, the perforations are in circumferential rows with the centers of the perforations in each row being staggered from the perforations in the adjacent rows. The preferred structure has been found to provide the most satisfactory overall result within the operative parameters desired for the subject filter element although other configurations having other dimensional characteristics could also be employed without departing from the intent of the present invention. The perforations may, of course, be conveniently formed in the material used for the end and side wall portions prior to their formation and assembly.

Figure 3:
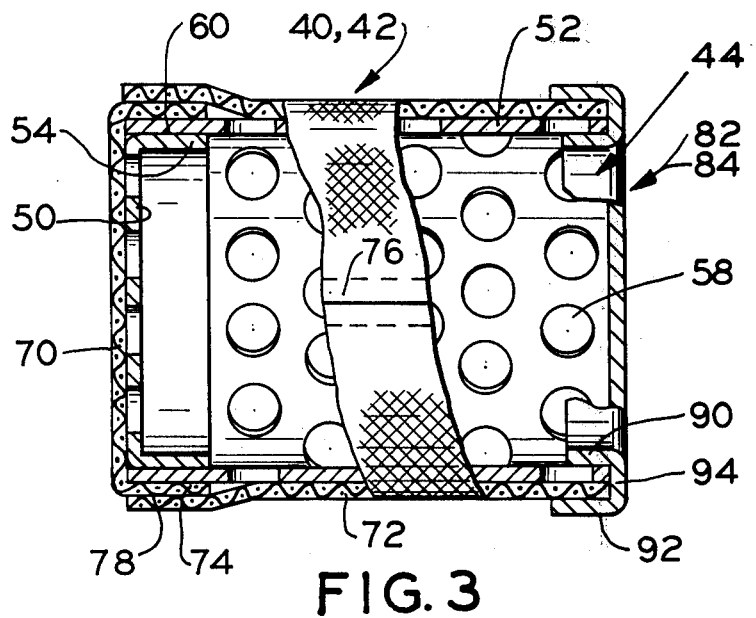
FIG. 3 is a cross-sectional view, in enlarged scale, of the subject strainer element showing the relative positioning of and interconnection between the element components.

Seam 56 preferably comprises a silver brazed butt seam and flange 54 is also silver brazed to side wall portion 52 at the area generally designated 60 in FIG. 3. The silver brazed butt seam 56 is particularly desired because the perforations in the opposed side edges of side wall portion which are to be joined do not necessarily match up during fabrication and when other types of joining are employed, the seam or joint has been found not to be as positive and as long lasting. Silver brazing is also preferred since it will not fail under the wide variety of operating parameters under which the subject strainer element may be subjected.

Straining structure 42 is preferably constructed from a stainless steel wire mesh and is also comprised of an end cap portion 70 and a side wall portion 72. End cap portion 70 includes a flange 74 depending from the outermost edge thereof. Side wall portion 72 is fabricated from a single piece of wire mesh materials having opposed side edges which are rigidly joined together at seam 76 and flange 74 is disposed in the inside of side wall portion 72 similar to that discussed above with reference to supporting structure 40.

However, with the wire mesh which comprises straining structure 42, it has been found particularly desirable that seam 76 and joinnt 78 be resistance welded rather than silver brazed. Accordingly, seam 76 and joint 78 comprise resistance welded lap seams and are performed such that there is no loose mesh wires protruding therefrom. When a brazing technique is employed, the brazing material has a tendency to wick into and clog the pores or openings of the wire mesh thereby reducing the overall available straining area of the strainer element. As was noted above, one intention for the subject invention is to provide an increased straining surface area in order to reduce turbulence and differential pressures when the strainer element is placed in actual use.

As best noted in FIG. 3, the dimensional relationship between supporting structure 40 and straining structure 42 is such that the straining structure is very closely received over the support structure with the open ends 82,84 of these two structures being substantially coextensive with each other. Binding ring 44 is annular and has a generally U-shaped cross-sectional configuration including an inner leg 90, an outer leg 92 and a bottom wall 94 with outer leg 92 being slightly longer than inner leg 90. This ring is also preferably constructed of stainless steel and is dimensioned such that the areas of side wall portions 52,72 adjacent open ends 82,84 will be closely received between legs 90,92 circumferentially therearound. Once so located, the binding ring is clinched securely to these portions and then silver brazed to them over the entire circumference thereof to achieve a permanent construction. The overall dimensioning of the strainer element B, particularly binding rings 44 is such that the outer surface of leg 92 will be closely received in strainer receiving area 16 of strainer arrangement A so that all fluid passing from inlet 26 to outlet 18 must pass through the strainer element.

Of course, while the subject invention has been disclosed with reference to construction from stainless steel material, other materials may also be employed using the structural concepts herein disclosed. However, from a practical standpoint, the material which offers the greatest degree of overall versatility for use of the subject strainer element is deemed to be type 316 stainless steel since, in addition to being a strong and durable material, it has a high resistance to abrasion and corrosion. The wire mesh material may be conveniently varied as to size in order to achieve desired operational results. For example, 40×40 mesh type (440 micron), 60×60 mesh type (230 micron) and 100×100 mesh type (140 micron) have all found satisfactory use in the subject strainer element for staining liquids of various types and purity. Other mesh sizes could also be used as may be necessary and desirable.

Use of the subject strainer is much the same as that disclosed with reference to the sintered filter in the commonly assigned U.S. Pat. Nos. 3,240,342 and 3,240,346. However, it should be appreciated that it is not intended to limit the subject strainer to such uses since other strainer bodies and styles are also available which may also readily employ the subject strainer element to great advantage. The environment shown and described with reference to FIG. 1 is merely for purposes of appreciating one application for the new strainer element. It is generally contemplated, however, that the strainer element will be used in a manner such that fluid or liquid to be strained will be passed from outside of the strainer into the inside. Thus, open ends 82,84 will normally be blocked from having any unstrained fluid passing therethrough similar to that shown in FIG. 1.

Accordingly, in the typical application shown, liquid will pass through the end cap and side wall portions of supporting and straining structures 40,42, out through the open ends thereof and then through the outlet of the straining assembly body. Spring biasing means 28 maintains a constant force against the end walls to retain the strainer element wedged in position in tapered strainer receiving area 16 so that unstrained fluid cannot pass thereby. When liquid enters the strainer assembly A through inlet 26 and passes toward outlet 18 under pressure, some of the liquid will continuously pass through strainer element end cap portions 70,50 and the rest will pass through side wall portions 72,52. Since liquid can pass through the end portions, there is no substantial deflection of the liquid from the end portions. Such deflections would otherwise cause turbulent flow within strainer assembly or arrangement A resulting in reduced liquid flow through the strainer and an increase in the differential pressure acting as strainer element B.

The subject invention is valuable in high pressure drop applications and has successfully withstood pressure differentials in the range of 1000 psi without collapsing or failure. The structure of strainer element B is also sufficiently rigid to withstand 50 lbs. of assembly and disassembly force applied to the end portions in either direction as, for example, by the coil spring 28. While normal flow through the subject strainer element is from outside to inside, it is possible, in certain circumstances, to employ the strainer element to strain fluid flow from the inside to outside. In this alternative use, however, the overall pressure differential rating is somewhat decreased.

If desired, the subject strainer element is readily cleanable when it becomes clogged or otherwise ineffective in use. It is simply necessary to remove the element from strainer arrangement A and backflush an appropriate cleaning agent or liquid through the element from inside to outside. Thus, the subject strainer element is reuseable and has an increased life over prior strainers of this general type.

The invention has been described with reference to the preferred embodiment. Obviously, modifications and alterations will occur to others upon the reading and understanding of the specification. It is our intention to include all such modifications and alterations insofar as they come within the scope of the appended claims or the equivalent thereof.

Having thus described our invention, we now claim:

1. A generally cup-shaped fluid strainer element allowing the straining of fluid passing through the side walls and a closed end wall thereof, said strainer element comprising:
a generally cup-shaped supporting structure having an open end, a continuous side wall defined by a generally cylindrical side wall portion and a closed end wall defined by an end cap portion having an outwardly depending flange area at the terminal edge thereof adapted to closely communicate with one end of said cylindrical side wall portion, said end cap portion being rigidly affixed to said cylindrical side wall portion at said flange area with said cylindrical side wall and end cap portion both having a pattern of spaced openings over the surfaces thereof;
a generally cup-shaped straining structure having an open end, a continuous side wall defined by a generally cylindrical side wall portion and a closed end wall defined by an end cap portion having an outwardly extending flange area at the terminal edge thereof adapted to communicate with one end of said cylindrical side wall portion, said end cap portion being rigidly affixed to said cylindrical side wall portion at said flange area with said straining structure cylindrical side wall and end cap portions being constructed from a wire mesh and dimensioned to be closely received over said support structure with the open ends of said supporting and straining structures being substantially coterminous with each other; and,
a binding ring having a generally U-shaped cross-section closely received over and rigidly affixed to the substantially coterminous open ends of said supporting and straining structures with one leg of said U-shaped cross-section being received over a portion of the inner surface of said supporting structure cylindrical side wall portion and the other leg of said U-shaped cross-section being received over a portion of the outer surface of said straining structure cylindrical side wall portion.

2. The strainer element as defined in claim 1 wherein said supporting structure cylindrical side wall portion is fabricated from a single piece of material having opposed side edges which are affixed to each other at a seam area extending generally longitudinally along the length of said side wall portion and said flange area on said supporting structure end cap portion is dimensioned to be closely received inside of said cylindrical side wall portion.

3. The strainer element as defined in claim 2 wherein said supporting structure end cap and cylindrical side wall portions are constructed from stainless steel, said end cap portion being affixed to said side wall portion by a silver brazed joint and said seam area in said side wall portion comprising a silver brazed joint.

4. The strainer element as defined in claim 1 wherein said spaced openings comprise a plurality of perforations disposed on staggered centers relative to the adjacent perforations.

5. The strainer element as defined in claim 4 wherein said supporting structure is constructed from stainless steel and said perforations are each approximately 0.085inches in diameter on 0.125inches staggered centers.

6. The strainer element as defined in claim 1 wherein said straining structure cylindrical side wall portion is fabricated from a single piece of wire mesh material having opposed side edges which are affixed to each at a seam area extending longitudinally along the length of said straining structure side wall portion and said flange area on said straining structure end cap portion is closely received inside of said cylindrical side wall portion.

7. The strainer element as defined in claim 6 wherein said straining structure end cap and cylindrical side wall portions are constructed from stainless steel wire mesh, said end cap portion being affixed to said side wall portion by means of a resistance lap weld and said seam area in said side wall portion comprising a resistance lap weld.

8. The strainer element as defined in claim 1 wherein said supporting and straining structures and said binding ring are constructed from stainless steel, said binding ring being rigidly affixed to said support and strainer structures at the open ends thereof by means of a silver brazed joint.

9. A generally cup-shaped fluid strainer element allowing the straining of fluid passing through the sides and a closed end wall thereof, said strainer element comprising:
 a generally cup-shaped supporting structure fabricated from stainless steel and having an open end, a continuous cylindrical side wall portion, and an end cap portion, said end cap portion having an outwardly depending flange area at the terminal edge thereof with said flange area closely received inside of said cylindrical side wall portion at the opposite end thereof from said open end and rigidly interconnected thereto, said cylindrical side wall and end cap portion having a pattern of spaced openings over the surfaces thereof;
 a generally cup-shaped straining structure fabricated from stainless steel wire mesh and having an open end, a continuous cylindrical side wall portion and an end cap portion, said end cap portion having an outwardly depending flange area at the terminal edge thereof with said flange area closely received inside of said cylindrical side wall portion of the opposite end thereof from said open end and rigidly interconnected thereto, said straining structure being closely received over said supporting structure with the open end of said supporting and straining structures being substantially coterminous with each other; and,
 a stainless steel binding ring having a generally U-shaped cross-section closely received over and rigidly affixed to said substantially coterminous open ends of said supporting and straining structures with one leg of said U-shaped cross-section being received over a portion of the inner surfaces of said supporting structure cylindrical side wall portion and the other leg of said U-shaped cross-section being received over a portion of the outer surface of said straining structure cylindrical sidewall portion.

10. The strainer element as defined in claim 9 wherein silver brazed joints rigidly affix said supporting structure end cap portion to said supporting structure cylindrical side wall portion and said binding ring to said supporting and straining structures; and, wherein a resistance lap weld rigidly affixes said straining structure end cap portion to said straining structure cylindrical side wall portion.

11. The strainer element as defined in claim 10 wherein said supporting structure cylindrical side wall portion is fabricated to a generally structure cylindrical configuration from a single piece of sheet stainless steel having opposed side edges which are affixed to each other by means of silver brazing at a seam area extending generally longitudinally along the length of said cylindrical side wall portion.

12. The strainer element as defined in claim 11 wherein said spaced openings comprise a plurality of perforations disposed on staggered centers relative to the adjacent perforations.

13. The strainer element as defined in claim 12 wherein said perforations are each approximately 0.085inches in diameter on 0.125inches staggered centers.

14. The strainer as defined in claim 10 wherein said straining structure cylindrical side wall portion is fabricated to a generally cylindrical configuration from a single piece of stainless steel wire mesh having opposed side edges which are affixed to each other by means of a resistance lap weld at a seam area extending generally longitudinally along the length of said side wall portion.

* * * * *